United States Patent [19]
Abramson

[11] Patent Number: 5,060,289
[45] Date of Patent: Oct. 22, 1991

[54] PORTABLE TUBE SHRINKING TOOL

[75] Inventor: Andrew E. Abramson, Excelsior, Minn.

[73] Assignee: Research, Incorporated, Eden Prairie, Minn.

[21] Appl. No.: 519,030

[22] Filed: May 4, 1990

[51] Int. Cl.⁵ .............................................. F24H 9/02
[52] U.S. Cl. .................................... 392/423; 219/388; 219/405; 219/461; 392/407; 392/409; 392/411; 392/418; 392/422; 392/426; 392/432
[58] Field of Search ............... 219/385, 388, 386, 389, 219/449, 461, 411, 405, 422, 478, 479, 492, 421, 512, 521, 553; 392/355, 375, 408, 418, 426, 432, 435

[56] References Cited

U.S. PATENT DOCUMENTS

| | | | |
|---|---|---|---|
| 2,426,976 | 9/1946 | Taulman | 219/19 |
| 2,614,480 | 10/1952 | Elmer | 99/327 |
| 2,654,587 | 10/1953 | Skivesen | 263/3 |
| 2,957,973 | 10/1960 | Torrez | 219/35 |
| 3,229,614 | 1/1966 | Matzenauer | 99/327 |
| 3,396,455 | 8/1968 | Sherlock | 29/498 |
| 3,470,046 | 9/1969 | Verdin | 156/86 |
| 3,645,066 | 2/1972 | Drygulski | 53/112 A |
| 4,164,642 | 8/1979 | Ebert | 219/449 |
| 4,307,284 | 12/1981 | Perron | 219/552 |
| 4,406,719 | 9/1983 | Mitsumoto et al. | 156/52 |
| 4,460,820 | 7/1984 | Matsumoto | 219/385 |
| 4,469,529 | 9/1984 | Mimura | 148/175 |
| 4,558,203 | 12/1985 | Bauridl | 219/214 |
| 4,749,843 | 6/1988 | Abramson | 219/411 |

Primary Examiner—Bruce A. Reynolds
Assistant Examiner—Tu Hoang
Attorney, Agent, or Firm—Kinney & Lange

[57] ABSTRACT

A radiant heating device including a pair of concave surfaces for directing radiant energy toward an object positioned through an access opening in a receiving space therebetween with these concave surfaces extending to either side of this opening.

7 Claims, 3 Drawing Sheets

PORTABLE TUBE SHRINKING TOOL

BACKGROUND OF THE INVENTION

The present invention relates to radiant heaters and, more particularly, to radiant heaters in which an object to be heated is received within an enclosure.

Radiant heaters have a wide range of uses from paint drying to shrinking heat-shrinkable tubes over wiring bundles or the like. In this latter use, the shrinking of heat-shrinkable tubing, many other methods have also been used. These include using a resistance heating clamp which can be placed around both an elongated object, such as bundle of wires, and a heat-shrinkable tube portion positioned thereover. Another method is based on using a hot air blower which has a stream of hot air emanating therefrom directed by its operator over surfaces of a heat-shrinkable tube previously placed around such a bundle of wires.

Radiant heaters have a number of advantages over the previously discussed methods for heating an object. Radiant heaters rapidly provide energy output after operation thereof is initiated. These heaters can reach operating temperatures, depending on conditions of use, in a typical range of 3 to 7 seconds. Radiant heaters are efficient because the object to be heated is directly heated by impinging infrared radiation without wasteful concurrent direct heating of the surrounding air. In addition, radiant heaters can be made small because the infrared sources typically used provide a relatively high output energy per unit size. A common radiant heating method is to use a radiant heater with a reflector behind the radiation source to direct the energy onto heat-shrinkable tube portions placed around an elongated object with again a concentrated heat directed over the heat-shrinkable tubing.

Previous radiant heaters have a shortcoming in that they are not well suited to heating an object on or very near a surface because of structural limitations about the radiant heating source. Often, there is a need to heat an object, such as bundles of wires or optical fibers, that are on or immediately adjacent a surface. The previous radiant heaters usually do not provide very uniform heating of an object if that object is adjacent a surface. Thus, there is a need to provide relatively rapid and uniform heating of heat-shrinkable tubing over elongated objects.

SUMMARY OF THE INVENTION

The present invention is a heating device which includes a pair of facing concave surfaces for directing radiant energy toward an object to be heated positioned in a receiving space between the concave surfaces. The radiant energy is produced by two pluralities of radiant heating lamps, each of which is located between the receiving space and a corresponding concave surface. The lamps and concave surfaces are contained within an enclosure that has an access opening to the receiving space, and with each concave surface substantially extending to that opening.

BRIEF DESCRIPTION OF THE DRAWINGS

FIG. 3 is a cross section view of the device shown in FIG. 2,

DETAILED DESCRIPTION OF THE PREFERRED EMBODIMENTS

Figure 1:
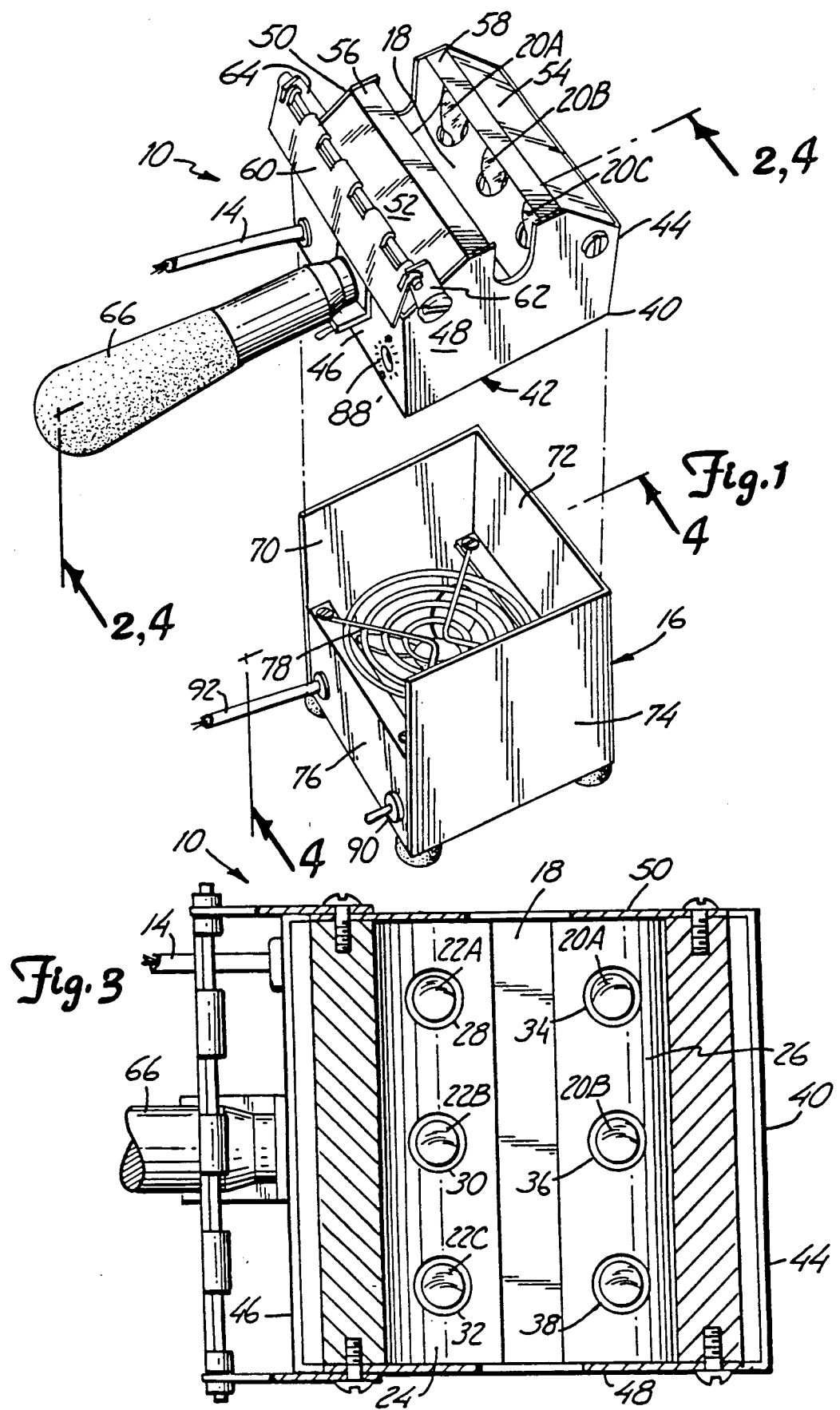
FIG. 1 is a pictorial view of a device embodying the present invention.
Figure 2:
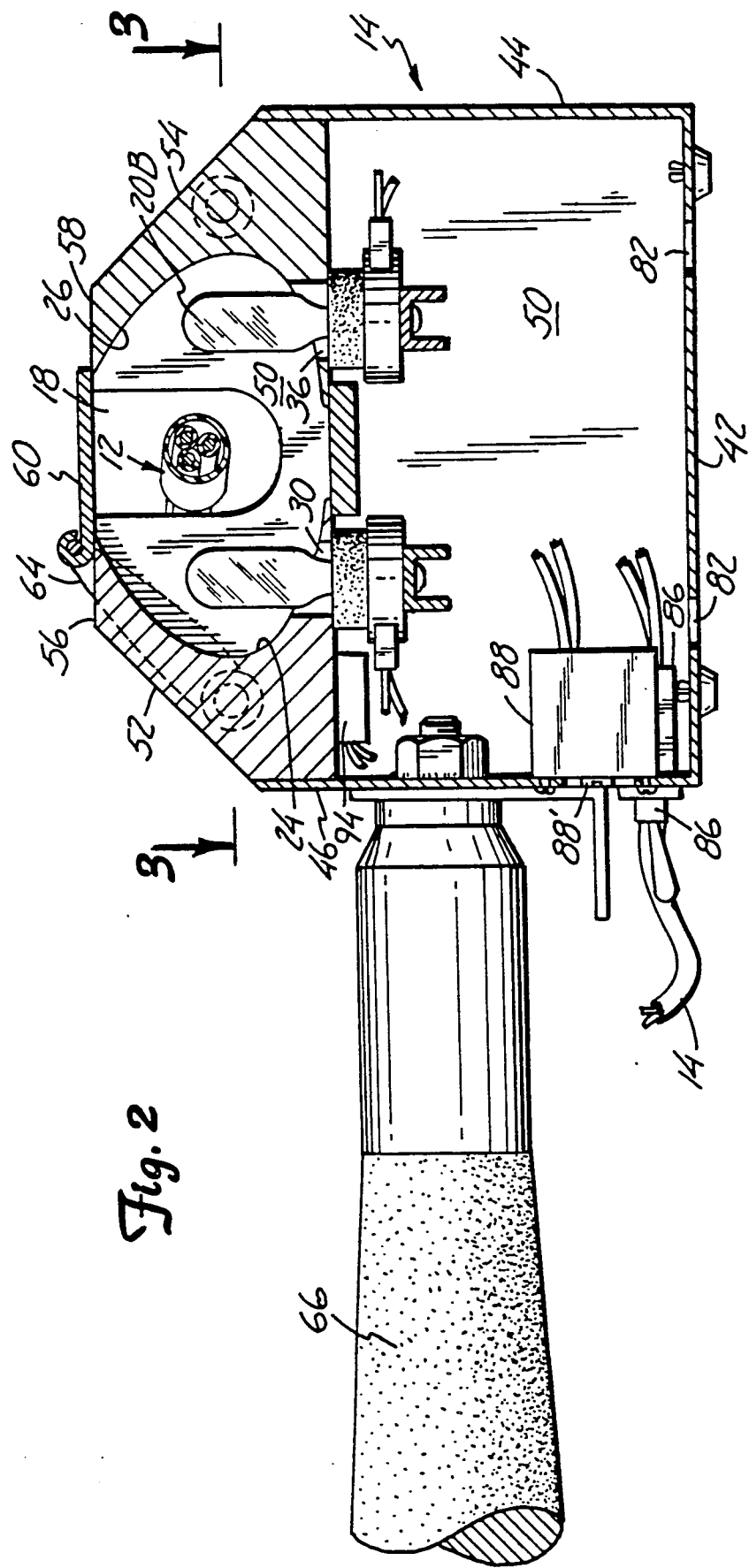
FIG. 2 is a cross section view of the device of FIG. 1.

FIG. 1 shows a radiant heating device, 10, embodying the present invention. FIG. 2 shows an elevation cross section view of device 10 taken at the location designated in FIG. 1. FIG. 3 shows a plan cross section view of device 10 taken at the location designated in FIG. 2. An example of an object to be heated, 12, is shown in FIG. 2. Object 12 could be a bundle of wires or a bundle of optical fibers around either of which heat shrinkable tubing is to be shrunk, or it could be pipes being joined by a bondable material at the joint therebetween, or the like. Object 12 is positioned for heating at least partially within heating device 10.

Heating device 10 includes an electrical supply cord, 14. A cooling stand, 16, is used to support device 10 when not in immediate use. Heating device 10 has a receiving space, 18, for receiving objects to be heated, such as object 12, that is in the form of an elongated space within heating device 10 between both the radiant energy sources and the corresponding reflectors.

On a first side of receiving space 18 is a first plurality of radiant heat lamps 20A, 20B and 20C. Lamps 20A, 20B, and 20C are positioned along a line parallel to the direction of elongation of receiving space 18 and generally form a boundary on one side for that space. A second plurality of radiant heat lamps, 22A, 22B and 22C, are located on a second side of receiving space 18 opposite the first side. Lamps 22A, 22B, 22C are positioned along another line parallel to the direction of elongation of receiving space 18 and generally form another boundary on the opposite side of this space. Lamps 20A, 20B, 20C, 22A, 22B, and 22C are 75 watt rated tungsten filament halogen lamps which provide radiated power proportional to the voltage across the filament thereof raised to a power approximately equal to 3/2, and thereby provide substantial useful radiated energy in the infrared spectrum for a voltage drop across the filament therein of 20 to 30 volts which voltages also conserve filament life.

Object 12 positioned in receiving space 18, being an absorber of infrared energy, is heated directly by this radiation without very much direct heating of the intervening air and surrounding environment which do not absorb such radiation nearly as well. Lamps 20A, 20B, 20C, 22A, 22B, and 22C have a clear quartz envelope and are electrically connected in series with one another.

Spaced from and on either side of receiving space 18 are a first structure with a concave surface, 24, and a second structure with a concave surface, 26. Concave surfaces 24 and 26 are elongated parallel to the direction of elongation of receiving space 18 to extend the full length of the receiving space, and each has a surface curving away from space 18 with a cross section generally following a parabola. Lamps 20A, 20B and 20C are located along a line between receiving space 18 and the concave surface 26, and lamps 22A, 22B and 22C are located along a line between receiving space 18 and concave surface 24. Object 12, when placed within receiving space 18, has both the first plurality of lamps 20A, 20B, 20C and the second plurality of lamps 22A, 22B, 22C between it and the corresponding one of concave surfaces 24 and 26.

Concave surface 24 has a series of holes, 28, 30 and 32, in a line, each for receiving a corresponding one of the first plurality of radiant heat lamps, lamps 20A, 20B, and 20C. Lamps 20A, 20B, and 20C extend through holes 28, 30 and 32, respectively, so as to be perpendicular to the direction of elongation of receiving space 18. Similarly, concave surface 26 has a series of holes, 34, 36 and 38, in another line, each for receiving the second plurality of radiant heat lamps, lamps 22A, 22B, and 22C. Lamps 22A, 22B, and 22C, like the first plurality of lamps 20A, 20B, and 20C, extend through these holes perpendicular to the direction of elongation of receiving space 18.

Concave surfaces 24 and 26 act to direct the radiation emitted by radiant heat lamps 20A, 20B, 20C, 22A, 22B and 22C into receiving space 18 to help achieve maximal radiant heat transfer between these lamps and object 12. Concave surfaces 24 and 26 are made from materials with low emissivity such as specular aluminum. Concave surfaces 24 and 26 extend essentially all the way to the upper access opening provided to receiving space 18 to thereby assure that substantial radiation is directed to locations immediately inside this access opening.

Heating device 10 has an enclosure, 40, that partly contains the structures having concave surfaces 24 and 26 (which structures may be considered as being part of enclosure 40), and contains radiant heat lamps 20A, 20B, 20C, 22A, 22B, and 22C. Enclosure 40 has a rectangular bottom, 42, having four upright sides, 44, 46, 48 and 50, as part thereof (in addition to the structures having concave surfaces 24 and 26). Two of the upright sides, 44 and 46, have a rectangular shape, and the other two sides, 48 and 50, each has a pair of upper edge portions with the members thereof formed at equal but opposite angles with respect to vertical on either side of a vertically directed, "U"-shaped upper edge opening therein. Corresponding ones of such upper edge portions in each of sides 48 and 50 are parallel to one another.

The top portion of heating device 10 is formed by the structures having concave surfaces 24 and 26 which may be considered parts of enclosure 40, and each has an exposed beveled surface, 52 and 54, respectively, with a bevel angle with respect to vertical matching the angle of the corresponding upper edge portions of sides 48 and 50. Each of these structures also has a central top surface portion, 56 and 58, respectively, immediately adjacent to the "U"-shaped openings in sides 48 and 50 that is parallel to the other such surface and to the bottom 42, and which also intersects the corresponding beveled surface in that structure. The structure having surfaces 24, 52 and 56 is separated from the structure having surfaces 26, 54 and 58 so that there is an opening between surfaces 56 and 58 that opens to receiving space 18 and is aligned with the U-shaped opening in each of sides 48 and 50. This is the access opening to receiving space 18 indicated above to which concave surfaces 24 and 26 extend. Beveled surfaces 52 and 54 reduce the structure that is in the plane that surfaces 56 and 58 share so that the access opening to receiving space 18 can be presented to and substantially enclose a wiring arrangement on a surface intended to have shrink tubing shrunken thereabout while minimizing the disturbance of any other wiring arrangements adjacent thereto.

Attached to the top portion of enclosure 40 is a hinged cover plate, 60, for covering the access opening to receiving space 18 formed by the separation between central top surface portions 56 and 58. Cover plate 60 has a first pivot arm, 62, and a second pivot arm, 64, for allowing cover plate 60 to rotate and pivot completely clear of the access to receiving space 18.

Attached to the upright side 46 of enclosure 40 is a cylindrical handle, 66. Handle 66 allows the operator to conveniently position heating device 10 on an object to be heated such as object 12.

Figure 4:
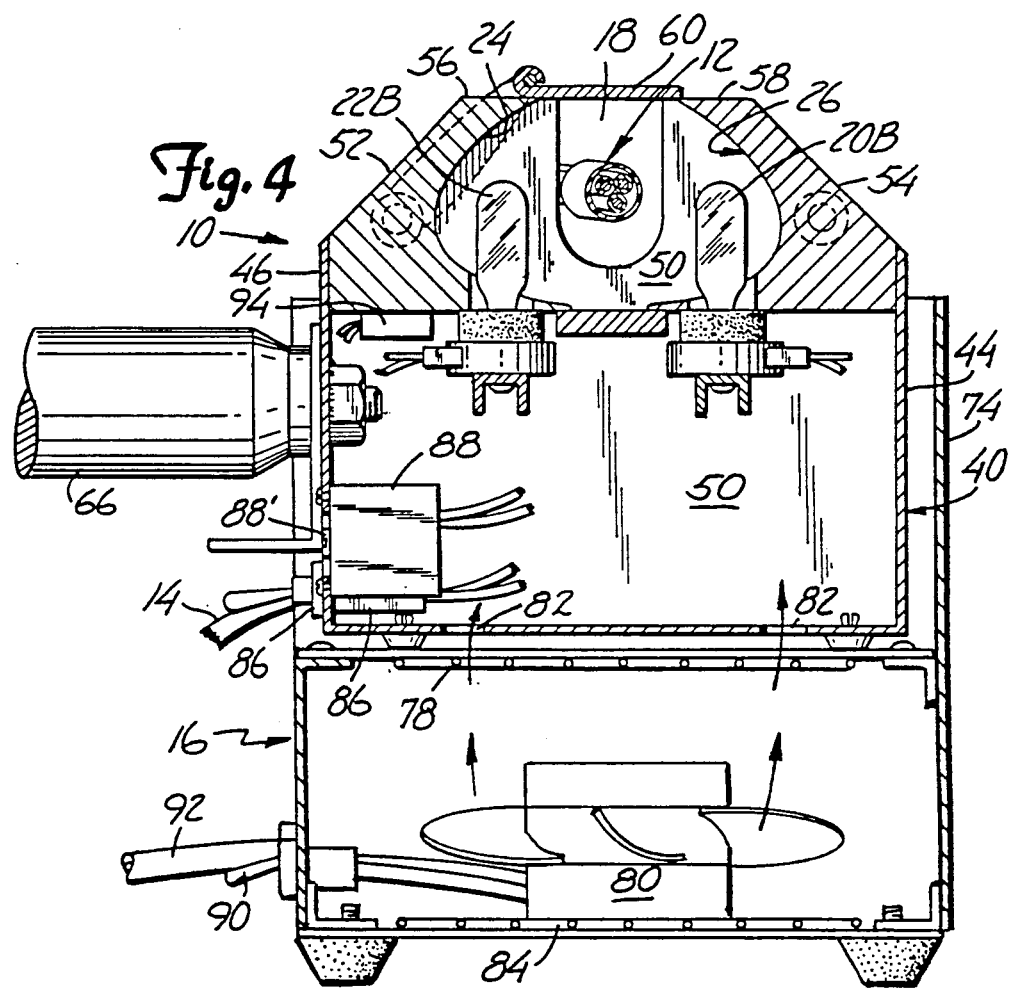
FIG. 4 is a cross section view of the device shown in FIG. 1.

Cooling stand 16 provides a rest support for heating device 10 when not in immediate use, particularly while heating device 10 is still hot. This cooling stand has three upright sides of equal height from its bottom, 70, 72 and 74, shown in FIG. 1, with a fourth side, 76, that is of a lesser height. Within the base of cooling stand 16 is an upper wire grid, 78, for receiving bottom 42 of device 10, best seen in FIG. 4 which is a cross section view of FIG. 1. A fan, 80, forces air to move past heating device 10 for cooling that device and permitting quick recovery in the event of any overheating therein which may occur. A plurality of holes, 82, are provided in bottom 42 of enclosure 40 of heating device 10 to allow air forced by cooling fan 80 to pass through and cool heating device 10. A further lower wire grid, 84, is provided in the bottom of cooling stand 16 through which fan 80 draws the cooling air.

In one mode of operation, the object to be heated, object 12 in this example, is placed inside receiving space 18 of heating device 10 after exposing the access opening to receiving space 18 through rotating and pivoting cover plate 60 away therefrom. Cover plate 60 is then pivoted back over the access opening to receiving space 18 to minimize radiant energy loss. Heating device 10 is switched on by switching a switch, 86, so as to draw power through supply cord 14 and energize radiant heat lamps 20A, 20B, 20C, 22A, 22B, and 22C. A timer, 88, providing a selectable time duration, selected through an opening 88' in side 46, shuts off heating device 10 when the desired timing cycle therefor is complete. Object 12 can then be removed from heating device 10 with the heat shrinkable tubing thereabout shrunken as desired. Cooling stand 16 can be switched on by a switch, 90, to draw power through an electrical supply cord, 92, to operate fan 80 to thereby keep heating device 10 cool when resting thereon between uses by keeping air moving past enclosure 40. A thermostat, 94, senses the temperature of the structure having surfaces 24, 52 and 56 and, if it has become too hot, prevents starting another heating cycle until this structure has cooled typically by leaving heating device 10 on cooling stand 16.

Since it is usually important to have the same radiant energy reach successive ones of objects to be heated if they are similar objects, provision is typically made in heating device 10 to protect against line voltage changes which could change the voltage dropped across the filaments of lamps 20A, 20B, 20C, 22A, 22B and 22C here connected in series as indicated above. One possibility is, of course, to provide regulated voltage derived from the line voltage to theses lamps and to timer 88 so any line voltage change does not affect the performances thereof. Another possibility is to have these lamps supplied unregulated voltage based on the line voltage but have timer 88 also receive that voltage in such a manner as to lengthen the duration originally selected for its timing out by an amount proportional to any reduction in voltage across the lamps, or shorten its time out in proportion to any voltage increase. Thus, the energy provided in timing cycles could be kept nearly constant from one to the next.

Figure 5:
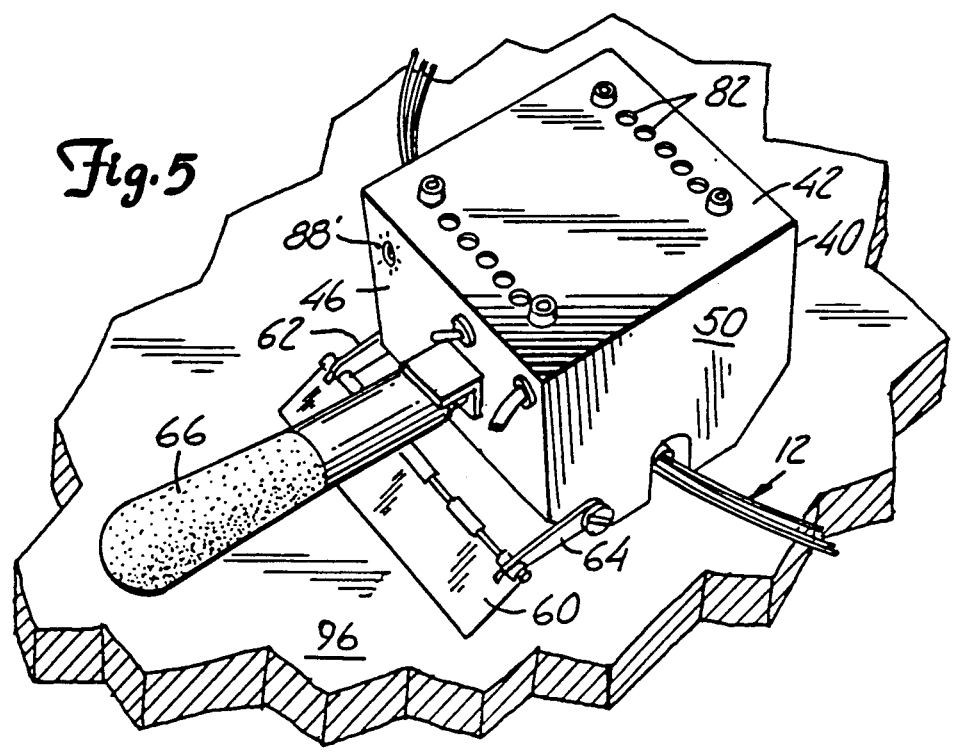
FIG. 5 is a pictorial view of the device of FIG. 1 being used to heat an object that is against a surface.

Alternatively, if the object to be heated is immediately adjacent a surface, such as object 12 against a surface, 96, in FIG. 5, heating device 10 can be positioned about that object with the surfaces 56 and 58 placed substantially against that surface after cover plate 60 has been rotated and pivoted free of the access to receiving space 18. As shown in FIG. 5, heating device 10 is positioned with object 12 in receiving space 18 and extending through the "U"-shaped edge openings in sides 48 and 50 thereof, with surfaces 56 and 58 being more or less against surfaces 96. Heating device 10 is then switched on, energizing the radiant heat lamps 20A, 20B, 20C, 22A, 22B, and 22C. The radiant heat produced is directed around object 12 by concave surface 24 and concave surface 26 so as to evenly heat object 12 essentially right down to surface 96. Once timer 88 switches off the lamps, heating device 10 may again be placed in cooling stand 16 to cool.

Although the present invention has been described with reference to preferred embodiments, workers skilled in the art will recognize that changes may be made in form and detail without departing from the spirit and scope of the invention.

What is claimed is:

1. A device for heating selected objects, the device comprising:

a pair or reflector means for directing radiant energy toward a receiving space therebetween each of which has a concave surface facing the other which is elongated in a selected direction, these concave surfaces being spaced apart by said receiving space such that an object for heating can be received therein;

two pluralities of lamps capable of providing radiant energy with each of these pluralities of lamps located between the receiving space and a corresponding one of the concave surfaces, these pluralities of lamps each having the lamps therein capable together of providing radiant energy generally along a line directed substantially parallel to the direction of elongation of the corresponding concave surface; and an enclosure containing the lamps and reflector means therein, the enclosure having an access opening therein permitting access to the receiving space with said access opening being elongated in said direction of elongation and with each said concave surface substantially extending to said access opening, the enclosure further having a first structure containing an aperture with said aperture intersecting said receiving space and with said aperture merging with said access opening whereby an elongated object can extend into said receiving space through said aperture.

2. The apparatus of claim 1 wherein the reflector means each have a plurality of holes, the number of holes therein at least equalling the number of lamps in the corresponding plurality of lamps, with each lamp therein extending through a corresponding hole.

3. The apparatus of claim 1 wherein there is provided a thermostat capable of sensing the temperature of one of said reflectors and of preventing at least temporarily some further production of radiant energy if the temperature of the reflector is greater than a selected value.

4. The apparatus of claim 1 wherein the enclosure includes a hinged cover-plate for covering the access opening in the enclosure.

5. The apparatus of claim 2 wherein each lamp extends from each hole in a direction substantially perpendicular to the direction of elongation of its corresponding concave surface.

6. A method for heating an object immediately adjacent a surface extending beyond it, the method comprising:

positioning a radiant heating device about an object on a surface through an access opening therein providing access to a receiving space therein for receiving the object, the radiant heating device having therein radiant heating lamps and a pair of concave surfaces facing one another and spaced apart by the receiving space with the concave surfaces each substantially extending immediately adjacent to an opposite side of the access opening for the receiving space;

applying electrical power to the device to cause the radiant heating lamps to emit radiant energy; and terminating the application of electrical power and removing the device from about the object and the surface after a selected time.

7. The apparatus of claim 1 wherein the enclosure further has a second structure spaced apart from said first structure, said second structure containing an aperture with said second structural aperture intersecting said receiving space and with said second structural aperture merging with said access opening, said first structural aperture and said second structural aperture providing a passageway through said receiving space.

* * * * *

UNITED STATES PATENT AND TRADEMARK OFFICE
CERTIFICATE OF CORRECTION

PATENT NO. : 5,060,289

DATED : October 22, 1991

INVENTOR(S) : Andrew E. Abramson

It is certified that error appears in the above-identified patent and that said Letters Patent is hereby corrected as shown below:

Col. 5, line 31, delete "or" and insert --of--.

Signed and Sealed this

Ninth Day of March, 1993

*Attest:*

STEPHEN G. KUNIN

*Attesting Officer*  Acting Commissioner of Patents and Trademarks